United States Patent [19]
Zanow

[11] 4,111,406
[45] Sep. 5, 1978

[54] CUSHIONING DEVICE

[75] Inventor: Andrey L. Zanow, Cleveland, Ohio

[73] Assignee: Midland-Ross Corporation, Cleveland, Ohio

[21] Appl. No.: 741,388

[22] Filed: Nov. 12, 1976

[51] Int. Cl.² .............................................. F16F 1/36
[52] U.S. Cl. .................................. 267/153; 267/63 R
[58] Field of Search ................... 267/21 R, 63 R, 140, 267/141, 152, 153, 162; 213/40 R, 40 D, 40 S, 45; 248/22, 24

[56] References Cited
U.S. PATENT DOCUMENTS

| | | | |
|---|---|---|---|
| 2,032,100 | 2/1936 | Spencer | 267/63 R X |
| 2,686,667 | 8/1954 | Willison et al. | 267/153 |

*Primary Examiner*—Johnny D. Cherry
*Attorney, Agent, or Firm*—Henry Kozak

[57] ABSTRACT

A compression-type cushioning pad provides load-travel characteristics to meet specific shock cushioning requirements. The pad comprises a metal plate having a cushion of elastomer bonded to at least one side thereof, the cushion having a corrugated surface configuration contoured to provide the desired load-deflection characteristics.

1 Claim, 14 Drawing Figures

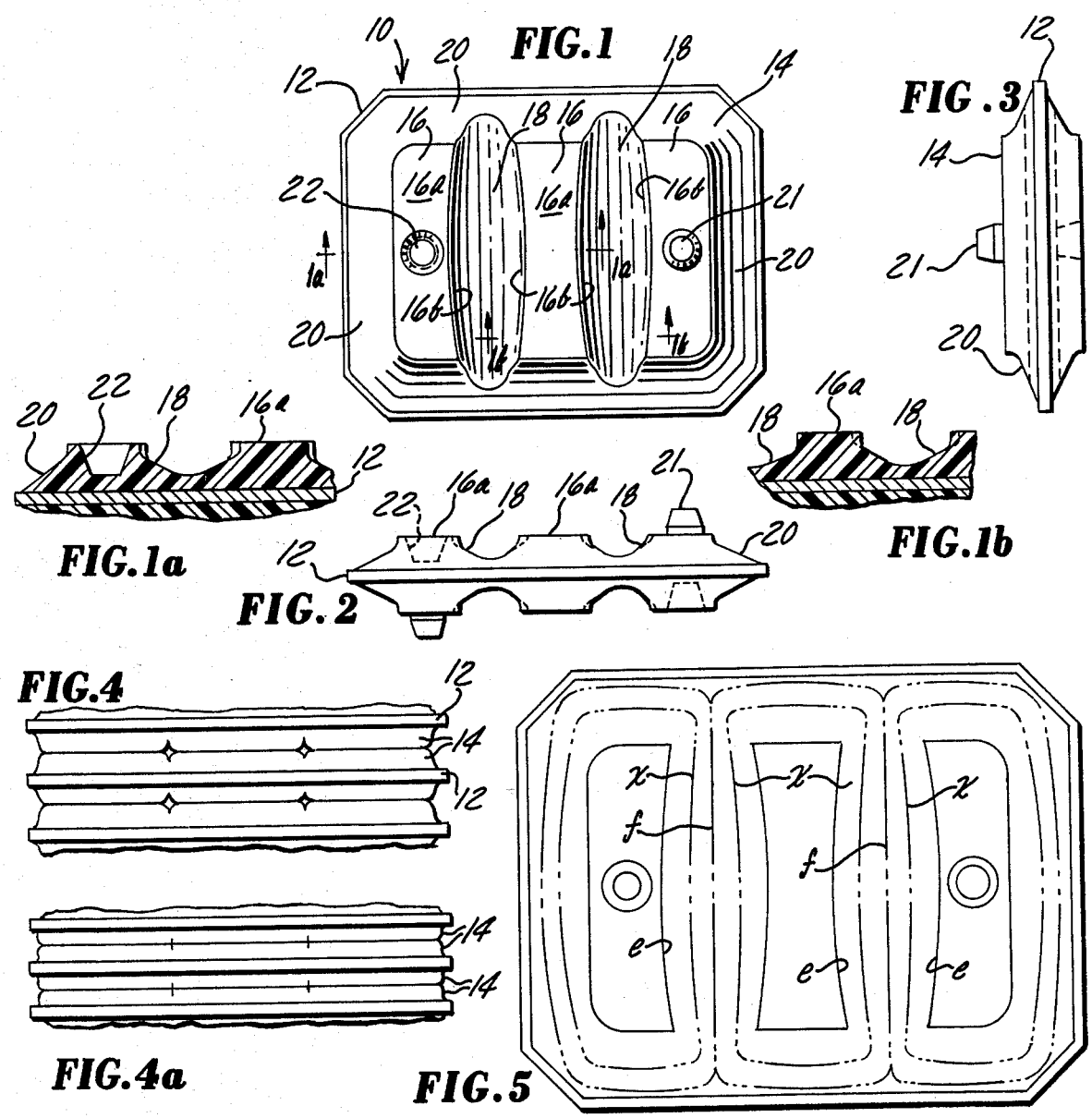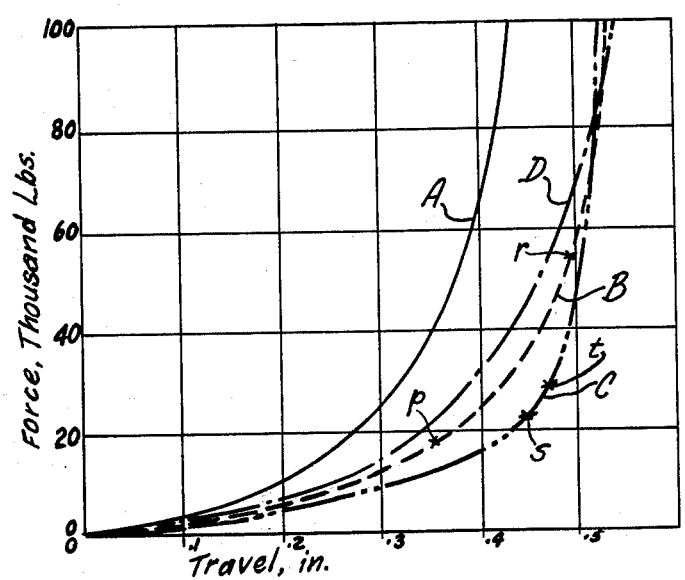

CUSHIONING DEVICE

BACKGROUND OF THE INVENTION

Rubber cushioned pads have been in use for years on railway and mine vehicles for cushioning impacts and shocks. Such pads also have been used in suspension systems on trucks and off-highway vehicles. A typical cushioning pad which has given excellent performance is disclosed in D. Willison U.S. Pat. No. 2,686,667, in which the rubber cushion thereof has a corrugated surface. In that patent the ridges in the corrugations are linear and of constant cross-sectional area throughout their length. When a pad of such configuration is compressed, the opposing side faces of the ridges will bulge toward each other and will come into contact first at the midpoint of the ridges and such contact will progressively increase toward the ends of the ridges until the faces are engaged substantially the entire length of the ridges. Once the faces of the ridges are in contact, the valleys are, of course, completely filled and under further loading the cushion will compress as though it were a block or solid body. The load-deflection characteristics of that pad will be such as to produce a stiffer action at light loads than may be desireable for a given type of service.

The present invention is directed to a pad having a resilient cushion of corrugated configuration having alternate ridges and valleys. In the preferred embodiment the sides of the ridges are so contoured that as the cushion is compressed, they will flow inwardly toward each other in such a manner as to come into contact approximately simultaneously over their entire length. In this manner full-length contact between the opposing sides of the ridges is delayed as compared with the pad in the aforementioned patent. Hence, at light loads this pad will provide a larger deflection and, therefore, softer action than the prior art pad. In another form of pad the sides of the ridges may be so contoured as to cause the opposing sides of the ridges to engage at their midpoint shortly after the pad is subjected to a compressive loading. This form of pad results in a stiffer action than the pad having its ridges of constant cross-sectional area and also provides greater deflection at higher load levels.

SUMMARY OF THE INVENTION

In accordance with the present invention, there is provided a cushioning pad comprising a plate member having an elastomeric cushion bonded to at least one side thereof, the cushion having a corrugated configuration providing alternate ridges and valleys, the ridges being so contoured as to flow into the valleys in a predetermined manner. In the preferred embodiment, the flow of elastomer from the ridges into the valley is such that under a predetermined load the valley is filled over its entire length at substantially the same time.

Accordingly, an object of the invention is to provide a cushioning pad of the type comprising a metallic plate to which a cushion of elastomer such as rubber is bonded, the face of the cushion having a corrugated configuration which departs from the usual straight corrugations to a non-linear type.

Another object is to provide a cushioning pad of the aforementioned type whereby a modified force-travel characteristic is obtained, particularly in the early stages of compression of the pad.

A further object is to provide a cushioning pad having an elastomeric cushion bonded to a metallic plate, the cushion having a corrugated surface configuration wherein the ridges of the corrugations are so contoured as to provide a load rate for suspension devices for trucks and other vehicles that is particularly suitable for empty or light load conditions.

A more specific object is to provide a cushioning pad having an elastomeric cushion formed with a corrugated surface configuration, the cross-sectional area of the ridges of the cushion varying at a predetermined rate from midpoint of a ridge to its ends.

A still further object is to provide a pad of the above type in which the cross-sectional area of the ridge varies progressively from a minimum at its midpoint to a maximum at its ends.

Another object is to provide a cushioning pad of the above type in which the configuration of the ridges is such that upon compression of the pad the flow of the elastomer into the valley between the ridges is such that the complete filling of the valley occurs substantially at the same time over the entire extent of the valley.

The features and advantages of the invention will become apparent from the detailed description taken in conjunction with the accompanying drawings.

BRIEF DESCRIPTION OF THE DRAWING

FIG. 1 is a plan view of a cushioning pad embodying the invention.

FIG. 1a is a vertical section taken along line 1a—1a of FIG. 1.

FIG. 1b is a vertical section taken along line 1b—1b of FIG. 1.

FIG. 2 is a side elevational view of the pad shown in FIG. 1.

FIG. 3 is an end view of the pad of FIG. 1.

FIG. 4 is a side elevational view of pads of the type shown in FIG. 1 compressed a predetermined amount.

FIG. 4a is a side elevational view of the pads of FIG. 4 compressed an additional amount.

FIG. 5 is a plan view of the pad shown in FIG. 1 but illustrating the flow of the ridges into the valleys during the compression of the pad.

FIG. 6 is a graph showing typical load-travel curves for various cushioning pads.

DESCRIPTION OF THE PREFERRED EMBODIMENTS

Figure 7:
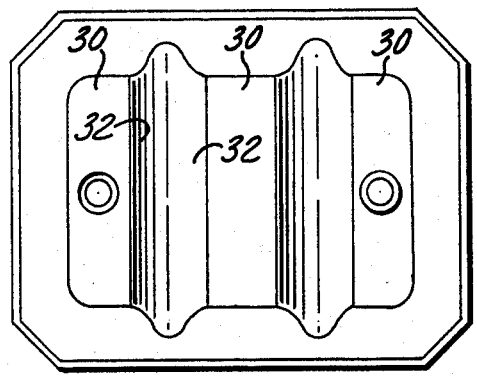
FIG. 7 is a plan view of a cushioning pad of the prior art type.

Cushioning pad 10 comprises a flat metallic plate 12 having a resilient cushion 14 of an elastomer such as rubber or similar material bonded to each side thereof. Cushion 14 in its free or uncompressed condition has a corrugated surface configuration comprising alternate ridges 16 and valleys 18 extending across the pad. In FIG. 1 three ridges and two valleys are shown for purposes of illustration, it being understood, however, that a greater number of ridges and valleys may be provided depending on the pad size and capacity required. It will be apparent that two ridges with a valley therebetween are the minimum number that is practicable. Cushion 14 at its peripheral edges slopes gradually upwardly from the surface of the plate, as at 20, to the edge of flat tops 16a of ridges 16. The thickness of the elastomer at each ridge 16 is preferably of the same dimension, each flat top surface 16a lying in a plane parallel to the plane of plate 12. The thickness of the elastomer at the bottom of valley 18 may vary depending on the load-deflection characteristics required but, for manufacturing purposes and pad durability, should not be less than about 10% of the thickness of the ridges. In order to accurately align a group of pads in face-to-face engagement the pad is provided with a dowel 21 and a complementary recess 22. Dowel 21 is preferably in the shape of the frustum of a cone. The fit between the dowel and dowel recess in an adjacent pad is precise so that accurate alignment of a group of pads is obtained.

In accordance with the invention, the opposing sides of ridges 16 are concavely contoured in a lengthwise direction as at 16b (see FIG. 1). This configuration results in the cross-sectional area of each ridge being a minimum midway between its ends and a maximum at each end, as seen in FIGS. 1a and 1b. It will be noted in FIGS. 1a and 1b that valleys 18 in transverse section are also concavely shaped, and for purposes of illustration are of approximately the same area as ridges 16. The outer sides of end ridges 16 are shown as being linear.

As the pad is subjected to a compressive load, the opposing sides 16b of the ridges will bulge or flow toward each other, thereby decreasing the size of valley 18. As the compression of the pad continues sides 16b attain the position shown in FIG. 4 in which the valleys 18 have become filled to a considerable extent. In FIG. 5 dot-dash line x represents the leading edge of the side surface 16b when the pad is compressed about the same amount as in FIG. 4. It will be observed that line x is less concave than the edge e of the ridge in its unloaded condition. As the pad is compressed further, the opposing sides of the ridges move closer together and come into contact substantially simultaneously along a straight line. This filling of the valley is illustrated in FIG. 4a and also in FIG. 5 in which line f represents the common line of engagement between the sides of the ridges. Once the valleys have been filled the cushion becomes in effect a solid block and upon further compressive loading the elastomer expands only along its outer peripheral surfaces.

Figure 7A:
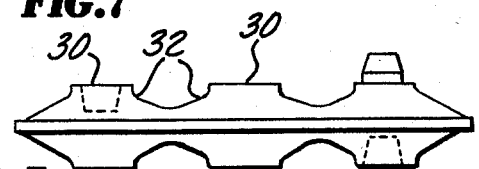
FIG. 7a is a side elevational view of the pad shown in FIG. 7.

Prior to explaining the load-travel characteristics of the pad, reference is made to the prior art pad 29 shown in FIGS. 7 and 7a, in which the ridges 30 are straight and of constant cross-sectional area. As this pad is compressed contact between the opposing sides 32 of the ridges will occur first at the midpoint of the ridges. As compression of the pad continues, the engagement between the sides of the ridges will progress from the initial contact at midpoint toward the ends of the ridges until the valleys are filled and complete engagement exists.

Referring now to FIG. 6, in which load in thousands of pounds is plotted against the travel or compression in inches, curve A represents the approximate load-travel characteristics of a block-type pad, such as one in which the cushion corresponds approximately in size and shape to that shown in FIGS. 1 or 7 but without the corrugations. This curve indicates that even for small initial deflection or travel the load increases rapidly. In other words, this pad will provide stiff cushioning action under light loads. It will also offer maximum resistance to compression at increasing loads, as seen from the steepness of the curve at the higher load levels.

Curve B represents the load-travel characteristics of the prior art pad of FIG. 7. Curve B indicates that the FIG. 7 pad has a softer overall cushioning action than the block pad. On curve B point $p$ indicates the load and travel at which the opposing sides 32 of pad 29 initially engage midway between the ends of the ridges, and point $r$ the load and travel at which sides 32 are fully engaged. It will be noted that the slope of the curve increases rapidly between points $p$ and $r$, signifying an accelerating load rate or resistance of the pad to compression.

Curve C represents the load-travel characteristics for the improved pad of FIGS. 1, 2 and 3. An inspection of this curve reveals that it has a lesser slope than curve B from 0 to about 0.45 inches displacement. This indicates a softer action for light to moderate loads than the prior art pad and shows that for a given load applied to the pad a greater deflection or compression thereof will occur. At point $s$ on curve C, the sides of the ridges are not yet engaged but at $t$ the engagement of the ridges and consequent filling of the valleys has been completed. At point $t$ the pad acts virtually as a solid block and the curve from that point on progresses steeply upwards. The load-travel characteristics as shown by curve C are particularly desireable for use in a suspension mechanism for vehicles such as trucks and off-highway equipment in which soft action is desireable for empty or light loads. Thus, the pad provides the advantage of soft light load cushioning along with reserve capacity for handling heavy loads. It will be understood that while the configuration of curve C is typical for the improved pad, the load-travel characteristics of a prescribed size of pad to meet specified service requirements are dependent on various factors such as, for example, the thickness and hardness of the elastomer cushion, and the number and spacing of the ridges. One or more of these factors may be varied to obtain the desired pad performance. A pad having its resilient cushion contoured in accordance with the invention so that the sides of the ridges will engage approximately simultaneously at a predetermined load will provide softer cushioning action at light loads than the prior art pad of FIG. 7 of comparable size.

Figure 8:
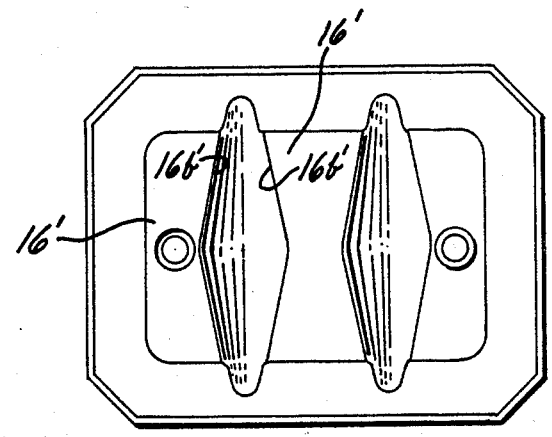
FIG. 8 is a plan view of a modified form of cushioning pad.

In FIG. 8 there is shown a cushioning pad that is modified from the pad of FIG. 1 in that the opposing sides 16b' of the ridges 16' are substantially straight as viewed in plan and converge in a direction from the midpoint of the ridge to its ends. In other respects this pad is similar to that of FIG. 1, including its load-deflection characteristics. An advantage of this pad, however, resides in connection with the production of the mold equipment for producing its ridge and valley configuration. The mold is less costly to produce for the converging straight side ridge configuration.

Figure 9:
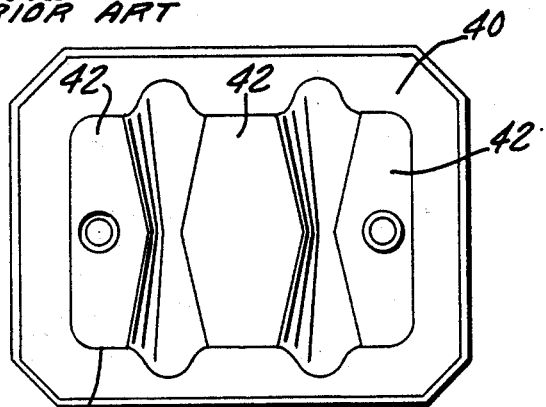
FIG. 9 is a plan view of another modified form of cushioning pad.

In FIG. 9 there is shown a pad in which the elastomeric cushion 40 has a ridge and valley configuration that is in a sense the reverse of the previous embodiments. The opposing sides of ridges 42 diverge outwardly from the midpoint of the ridges to the ends thereof. The load-travel characteristics of this pad are represented by curve D in FIG. 6. It will be seen that the most of curve D falls between that of curves A and B. Thus the modified pad provides softer action than a cushion of the solid block type but is stiffer than the prior art cushion for light and intermediate loads. This results from the engagement at the midpoint of the opposing sides of the ridges, which occurs earlier than the prior art pad or the pad of FIG. 1, during compression of the pad. As the load on this pad is increased, the engagement between the opposing sides of the ridges progressively increases toward the ends of the ridges but at a slower rate than for the pads having FIG. 1, FIG. 7 or FIG. 8 configurations. Curve D, therefore, in its upper portions crosses curves B and C, which results from the fact that higher loading is required to close the valleys near the end of the ridges. This pad, therefore, offers load-travel characteristics that are suitable for use in cushioning arrangements requiring softer action than the solid block type cushioning pad provides.

Figure 10:
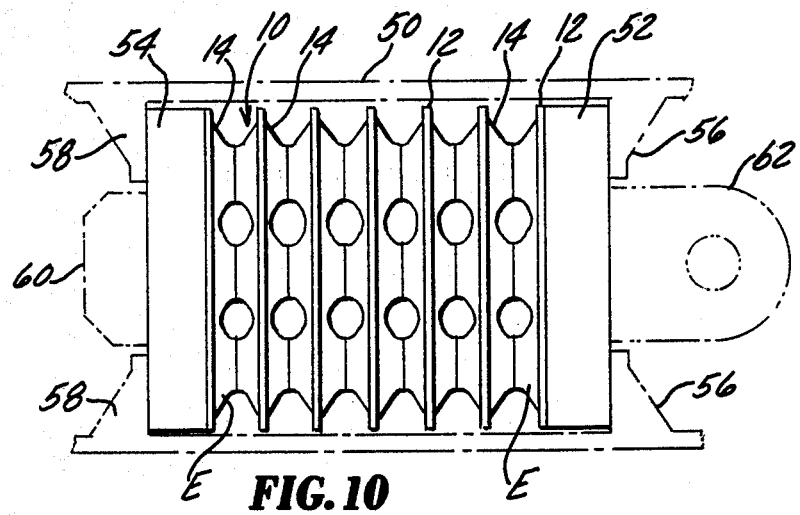
FIG. 10 is a plan view of a group of pads embodying the invention applied to a railway vehicle.

FIG. 10 illustrates the application of a group of pads 10 embodying the invention to a railway vehicle. The pads are disposed in the usual draft gear pocket formed by the car frame 50. Front and rear followers 52 and 54, respectively, are in engagement with stops 56 and 58 on the car frame. A yoke 60 surrounds the pads and followers and transmits draft and buffing loads to the pads. A car coupler (not shown) is connected to the forward end 62 of the yoke. It will be observed that end pads E of the group have a resilient cushion 14 only on one side of plate 12. This avoids abrasion of the cushion by the followers, as would occur if the end pad were to have cushion 14 on both sides of the plate.

A group of pads such as shown in FIG. 10 may, of course, be vertically arranged for use in suspension systems for trucks and off-highway vehicles.

What is claimed is:

1. A compression-type cushioning pad comprising a plate member having an elastomeric cushion bonded to a side of said member, said cushion having alernate ridges and valleys extending across the pad, each of said ridges being of maximum cross-sectional area at its midpoint and the opposing sides of said ridges diverging from their midpoint to the outer ends of the ridges, the opposing sides of said ridges being so contoured that upon the application of a predetermined compressive load to said pad, the opposing side of said ridges flow towards each other in such a manner that filling of said valleys occurs at the bottom thereof at point midway between the longitudinal ends thereof and said filling continuing until the opposing sides of said ridges come into contact at the midpoint thereof and under increasing compressive load engagement between said opposing sides progresses toward the ends of said ridges.

* * * * *